3,419,398
LIQUID FOOD PRODUCT AND PROCESS FOR PREPARING SAME
Maynard Murray, Wilmette, Ill., assignor to Creative Chemistry, Inc., Glen Ellyn, Ill., a corporation of Illinois
No Drawing. Filed Feb. 26, 1965, Ser. No. 435,728
6 Claims. (Cl. 99—28)

ABSTRACT OF THE DISCLOSURE

Preparation of a clear dairy-product food by acidifying whey with citric acid, adding tannic acid to precipitate the higher molecular weight lactalbumins, separating gelatinous albuminous substances therefrom and recovering a liquid lacteal serum as the clear dairy product.

SPECIFICATION

This invention relates to the manufacture of beverages from liquid lacteal materials such as liquid whey. More particularly, it relates to novel liquid food compositions prepared from whey, which compositions contain the globulin, substantially all of the calcium, phosphorus and vitamins present in the original whey and are substantially free of higher molecular weight lactoalbuminous substances.

It is an object of the present invention to provide salutary beverage made from treated whey. A further object of this invention is the manufacture of a whey drink of high nutritional value which contains many of the healthful constitutents of natural whole milk. A still further ob- object is the provision of a nourishing dairy-product beverage which can be flavored and carbonated to appeal to children accustomed to drinking conventional soft drinks.

Broadly, the above and other objects of the instant invention are achieved by contacting raw whey with an agent selectively reactive with lactoalbuminous substances having a molecular weight greater than the globulins and low molecular weight proteins present in whey and thereafter separating a gelatinous fraction containing the higher molecular weight albuminous substances. The remaining product contains milk sugar, soluble inorganic salts, vitamins, as well as the lactoglobulins and lower molecule weight protein but is substantially free of the higher molecule weight albuminous substances which are responsible for the objectionable taste and odor of natural raw whey.

In one embodiment of the present invention the selectively reactive agent removes the higher molecule weight albuminous substances by physical reaction therewith. In another embodiment, a chemical reaction is employed to fractionally separate the lactalbumins.

Whey is the product remaining after the removal of fat and casein from milk in the process of cheese making. It is about 93% by weight water, contains approximately 5% milk sugar, that is lactose, about ½% dissolved minerals, less than ½% fat and 1%–2% protein. The mineral content primarily comprises soluble salts of calcium, sodium, potassium and phosphorus. In most cheese making processes, the vitamins in the milk are not removed and passed through into the whey. This includes large amounts of riboflavin and other B vitamin materials.

Whey has been a problem for many years in all the dairy states. Hundreds of millions of gallons must be disposed of every year. Most states have water pollution legislation forbidding the dumping of whey into streams and the cheese factories have encountered increasing difficulties in disposing of this troublesome by-product.

The present invention provides a method of converting whey into a potable beverage of exceptionally high nutritional value. It is a feature of the present invention that the process steps are simple and inexpensive. A further feature is that the novel fractional separation leaves the alpha, beta and gamma globulins in solution. The globulins are extremely desirable as they are a source of antibodies and beneficial in fighting disease. The treated whey product has a low caloric content, and it contains nearly all of the milk sugar and vitamins which were present in the original whey. A particular advantageous feature of the new drink is the fact that, since only natural milk sugars are present, the problem with dental caries is substantially eliminated. The treated whey can readily be flavored with conventional flavorings, such as cola, ginger ale, orange and other fruit flavors.

The raw whey employed in the process should be of good edible quality, such as is produced from the manufacture of cheese or casein. For example, edible quality sweet Cheddar cheese whey gives good results. Ordinarily, such whey has a pH of about 7.0–8.3 (milk acidity test from 0.06% to 0%) and a nitrogen content of about 0.13 to 0.14% corresponding to 0.81 to 0.88% protein (N+6.25). It is obtained by removing the casein and the fat from whole milk to produce an aqueous liquid containing milk sugar, milk albumins and milk salts. The raw whey before treatment may be on the acid side, neutral or basic. Two of the principle methods of removing casein from milk are by the use of acid or the use of rennet. Acidification precipitates the casein with a minium of calcium and other metal compounds, whereas rennet precipitates the casein with substantial quantities of calcium and other salts. Neither method will precipitate the lactalbumin which heretofore has been removed practically only by a heat coagulation procedure which results in complete coagulation of the lactoglobulins leaving in place in the remaining fluid, which can hardly be called a whey because of the complete removal of protein material, little more than the milk sugar and soluble salts.

In the present process, the lactalbumins are fractionally separated so that the higher molecular weight substances can be removed while leaving behind all the beneficial globulins in undenatured form.

In one embodiment of the present invention the fractional separation is achieved using a physical process in which a finely ground diatomaceous earth is employed to absorb the high molecular weight gelatinous material. In an alternative procedure, the fractional separation is accompanied by chemical reaction with a novel combination of acids. In this latter embodiment, citric and tannic acid are used in combination to selectively precipitate the obnoxious albuminous substances while leaving the lactoglobulins in solution. In accordance with this invention, citric acid is added to acidify the whey. Generally, 10–15 gms./litre, based upon the volume of whey, will be sufficient to bring the whey into the acid range. Thereafter, in the range of from about 0.7 to 1.0 gms./litre of tannic acid, based upon the volume of whey, is added to precipitate the higher molecular weight albuminous substances at a temperature in the range of from 0° to 60° C. The gelatinous albuminous substances precipitated by the addition of the acids is separated to recover a palatable liquid product having a pH in the range of about 2.5 to 6.3 and more preferably in the range of from 4 to 5, substantially free of albuminous substances having a molecular weight greater than the lactoglobulins of the whey. The calcium, sodium and potassium contents of this product will be each in the range of about 0.1 to 1.0 weight percent, with a total nitrogen content in the range of about 0.01 to 0.05 weight percent.

The diatomaceous earth can be any of the natural occurring diatomites such as DE, kieselguhr, guhr, siliceous earth, ceyessatite, tripolite and infusorial earth. These are soft earthy rocks having an apparent specific gravity of from 0.15–0.45, composed of the siliceous skeletons of small aquatic plants, called diatoms.

Typical analysis:

| | Percent |
|---|---|
| Silica ($SiO_2$) | 86.89 |
| Alumina ($Al_2O_3$) | 2.32 |
| Ferric Oxide ($Fe_2O_3$) | 1.28 |
| Lime (CaO) | 0.43 |
| Potash ($K_2O$) | 3.58 |
| Water ($H_2O$) | 4.89 |

Diatomaceous earth is porous with a high inner surface. Generally, it has a weakly acid or neutral reaction of such type that it has a pH value in the range of 4.0–8.0 in suspension in distilled water. Its effectiveness in fractionating the albumins in whey is tremendously enhanced by utilizing an extremely finely ground diatomaceous earth. Preferably, at least 80% by weight will pass through a screen of 70 micron mesh size.

The following examples are given for illustrative purposes and illustrate the invention with both physical and chemical albumin fractionating methods.

In this example a batch of raw, fresh, whole whey was passed through a filter bed containing a suitable diatomaceous earth filtering medium. Slight pressure can be employed to increase the rate of flow if desired. Filtering temperature is not important and will generally be room temperature, i.e., approximately 20° C. The diatomaceous earth employed was placed in a conventional pressure filtering apparatus and the raw whey passed through. The absorption material had the following particle size distribution:

| | Percent |
|---|---|
| 20–30 microns (conchoidal) | 70 |
| 50–60 microns (conchoidal) | 10 |
| 70 microns by 10 microns (needles) | 20 |

The treated whey which was recovered was a clear colorless liquid having a pleasant taste. It was completely free of turbidity caused by higher molecular weight albuminous substances. Analysis of original untreated whey and the treated product are compared below in Table I.

TABLE I

| | Raw whole whey | Treated whey |
|---|---|---|
| Total solids (mg./l.) | 60,520 | 5,040 |
| Calcium (mg./l.) | 18,600 | 310 |
| Phosphorus (mg./l.) | 5,140 | 120 |
| Lactose (mg./l.) | 8,300 | 830 |
| Protein (mg./l.) | 21,600 | 2,980 |
| pH | 3.4 | 6.3 |

The treated whey recovered from the absorption process was thereafter flavored with cola, ginger ale, fruit flavorings and the like and cardboard using conventional flavorings and bottling equipment.

In this example a batch of raw fresh whey from Mozzarelle cheese was first heated to about 200° F. for ten (10) minutes and then cooled to below 60° F. Thereafter 25 cc./liter of a 50% citric acid solution was added to bring the whey into the acid range. To this was added 9 cc./liter of a 10% solution of tannic acid. The precipitated albuminous substances were separated by filtration leaving a clear, colorless liquid which was pasteurized at 178° F. for ten (10) minutes. The resulting product having a caloric value of 20.4 calories/100 ml. was then flavored and carbonated. Analysis of the treated whey after filtering is given below in Table II:

TABLE II

| Analysis of treated whey | mg./liter |
|---|---|
| Solids | 67,300 |
| Calcium | 396 |
| Phosphorus | 413 |
| Lactose | 44,000 |
| Protein | 2,300 |
| pH | 2.55 |

While the present invention has been described with particular embodiments thereof, it will be understood that those skilled in the art may make various changes and modifications without departing from the true spirit and scope of the present invention. Therefore, by the appended claims, it is intended to cover all such changes and modifications.

What is claimed is:

1. A process for preparing a clear, dairy-product food which comprises
    acidifying whey with citric acid and then adding tannic acid to precipitate the higher molecular weight lactalbumins,
    separating the gelatinous albuminous substances precipitated by the addition of said acids, and
    recovering a liquid lacteal serum substantially free of albuminous substances having a molecular weight greater than the lactoglobulins of said whey.

2. A clear liquid food product containing lactoglobulins and inorganic salts, milk sugar, phosphorus and vitamins, but being substantially free of higher molecular weight albuminous substances of the lactalbumin class, and being prepared by the method defined in claim 6.

3. A process for preparing a clear, dairy-product beverage which comprises
    treating whey with sufficient citric acid to acidify said whey and in the range of about 0.7–1.0 gm./litre of tannic acid based on the volume of whey treated,
    removing the gelatinous albuminous substances precipitated by the addition of said acids, and
    recovering a liquid lacteal serum substantially free of albuminous substances having a molecular weight greater than the lactoglobulins of said whey.

4. A process for preparing a clear, dairy-product beverage which comprises
    treating whey with citric acid, in an amount sufficient to acidify said whey, and in the range of 0.7–1.0 gm./litre of tannic acid based on the volume of whey,
    separating the gelatinous albuminous substances precipitated by the addition of said acids, and
    recovering a palatable liquid product having a calcium, sodium and potassium content each in the range of about 0.1–1.0 weight percent and a total nitrogen content in the range of about 0.01–0.05 weight percent.

5. A process for preparing a clear, dairy-product beverage which comprises
    mixing tannic acid and citric acid with whey in amounts in the range of 0.7–1.0 gm./litre and 10–15 gms./litre, respectively, based on the volume of whey,
    separating the gelatinous precipitate formed by the addition of said acids, and
    recovering a palatable liquid product having a calcium, sodium and potassium content each in the range of about 0.1–1.0 weight percent and a total nitrogen content in the range of about 0.01–0.05 weight percent.

6. A process for preparing a clear dairy-product beverage which comprises
    treating whey with citric acid in an amount sufficient to acidify said whey, and in the range of 0.7–1.0 gm./ litre of tannic acid, based on the volume of whey,
separating the gelatinous precipitate formed by the addition of said acids, and
recovering a palatable liquid product having a pH in the range of from 4 to 5, and a total nitrogen content in the range of about 0.01–0–05 weight percent.

References Cited

UNITED STATES PATENTS

| | | | |
|---|---|---|---|
| 2,023,014 | 12/1935 | Flanigan et al. | 99—57 X |
| 2,497,420 | 2/1950 | Scott et al. | 99—57 X |
| 2,606,181 | 8/1952 | Pratt et al. | 99—57 X |
| 2,708,166 | 5/1955 | Tumerman et al. | 99—57 |

OTHER REFERENCES

Whittier et al., Byproducts From Milk, Reinhold Pub. Corp. N.Y., 1950, p. 213. SF 239. W58.

RAYMOND N. JONES, *Primary Examiner.*

STEVEN E. HEYMAN, *Assistant Examiner.*

U.S. Cl. X.R.

99—57